(12) United States Patent
Schmidt et al.

(10) Patent No.: US 7,873,379 B2
(45) Date of Patent: Jan. 18, 2011

(54) CONFERENCE COMMUNICATION SYSTEM AND METHOD WITH NOTIFICATION

(75) Inventors: Andreas Schmidt, Braunschweig (DE); Norbert Schwagmann, Lehe (DE); Holger Schmidt, Braunschweig (DE)

(73) Assignee: Infineon Technologies AG (DE)

( * ) Notice: Subject to any disclaimer, the term of this patent is extended or adjusted under 35 U.S.C. 154(b) by 1109 days.

(21) Appl. No.: 11/470,194

(22) Filed: Sep. 5, 2006

(65) Prior Publication Data

US 2007/0071210 A1   Mar. 29, 2007

(30) Foreign Application Priority Data

Sep. 5, 2005   (DE) .................. 10 2005 042 141

(51) Int. Cl.
  *H04B 7/00*   (2006.01)
(52) U.S. Cl. .................. 455/519; 455/518; 709/204
(58) Field of Classification Search ............... 455/518, 455/519, 412.2; 370/260, 270
  See application file for complete search history.

(56) References Cited

U.S. PATENT DOCUMENTS

| | | | |
|---|---|---|---|
| 7,593,359 B2 * | 9/2009 | Eneroth et al. | 370/312 |
| 7,596,102 B2 * | 9/2009 | Forbes et al. | 370/260 |
| 2004/0152458 A1 * | 8/2004 | Hottinen | 455/423 |
| 2006/0031294 A1 * | 2/2006 | Poikselka | 709/204 |
| 2006/0046758 A1 * | 3/2006 | Emami-Nouri et al. | 455/518 |
| 2006/0084454 A1 * | 4/2006 | Sung et al. | 455/518 |
| 2006/0094455 A1 * | 5/2006 | Hannu et al. | 455/518 |
| 2006/0120308 A1 * | 6/2006 | Forbes et al. | 370/260 |

FOREIGN PATENT DOCUMENTS

| | | |
|---|---|---|
| DE | 199 43 453 A1 | 3/2001 |
| DE | 10 2004 005 253 A1 | 8/2005 |
| EP | 0 744 858 A2 | 11/1996 |
| EP | 0 898 424 B1 | 10/2001 |
| EP | 1 343 290 A2 | 9/2003 |
| EP | 1 489 785 A1 | 12/2004 |
| WO | WO-2004/028113 A1 | 4/2004 |

OTHER PUBLICATIONS

IETF Internet Draft, "The Binary Floor Control Protocol (BFCP)", (draft-ietf-xcon-bfcp-02.txt), Oct. 2004.
Open Mobile Alliance: "PoC User Plane Version 1", Candidate Version 1.0, Apr. 2005.
IETF Request for Comments RFC3550, "RTP: A Transport Protocol for Real-Time Applications" (rfc3550), Jul. 2003.
IETF Internet Draft, "A Framework for Conferencing with the Session Initiation Protocol," (draft-ietf-sipping-conferencing-framework-00.txt), May 2003.
Open Mobile Alliance: "Push to talk over Cellular (PoC)—Architecture," Draft Version 1.0, Nov. 2004.
IETF Internet Draft, "A Session Initiation Protocol (SIP) Event Package for Conference State" (draft-ietf-sipping-conference-package-06.txt), Oct. 2004.

* cited by examiner

*Primary Examiner*—Creighton Smith
(74) *Attorney, Agent, or Firm*—Dickstein Shapiro LLP (57) ABSTRACT

A conference communication system including a conference server which provides a conference for a first and a second communication terminal, a notification device which generates a notification message according to a media data transmission control protocol which is used for signaling whether media data sent out by the first communication terminal have been forwarded to the second communication terminal.

32 Claims, 4 Drawing Sheets

CONFERENCE COMMUNICATION SYSTEM AND METHOD WITH NOTIFICATION

CROSS-REFERENCE TO RELATED APPLICATION

This application claims priority to German Patent Application Ser. No. 10 2005 042 141.5-42, which was filed on Sep. 5, 2005, and is incorporated herein by reference in its entirety.

TECHNICAL FIELD

The invention relates to a conference communication system, a method for operating a conference communication system, a notification device and a method for notifying a communication terminal.

BACKGROUND OF THE INVENTION

In conference communication services, several participants of a conference are enabled to communicate with one another by means of communication terminals. Participants can be participants of a number of conferences. If a participant participates simultaneously in a number of conferences, only media data from one conference are typically transmitted to him at one time. In particular, the case can occur where media data from a conference are not transmitted to any of the participants since media data are generated at the same time in other conferences in which the participants are participating, and are transmitted to the participants.

DETAILED DESCRIPTION

To provide for an orderly communication in a conference, not all participants of the conference typically have the right to communicate, that is to say to send audio messages (or video messages etc.) to the other conference participants, at the same time. The communication right, that is to say the right to communicate, is issued to the conference participants in accordance with particular rules. This issuing is called "floor control". The rules are called "floor policy".

In communication systems in large conference rooms, that is to say in the case of conference communication systems permanently installed, microphones and loudspeakers are provided for the conference participants for voice communication. For a conference participant to be able to transmit an audio message to the other conference participants, the microphone of the conference participant must be activated. If a microphone is activated, all other microphones are typically blocked, that is to say that that which is spoken into the other microphones is not output by means of the loudspeakers. In some cases, one further microphone is activated, for example that of the conference leader. Furthermore, communication systems are known which enable (conference) participants who are far away from one another to communicate with one another by means of a telephone conference or a video conference. Such conferences can be provided, for example, by means of an IMS (Internet Protocol Multimedia Subsystem). In such communication systems, the participants are typically enabled to transmit audio messages or messages of another type (video messages etc.) at the same time.

In mobile radio communication systems, communication services are known which, like a conference communication system in a conference room or like communication by means of walkie-talkies, only enable a single participant to transmit audio messages to the other conference participants at any one time. These communication services are known by the designation push-to-talk (PTT) such as, for example, the "direct connect" communication service which is provided by the Nextel company in the USA, or the PoC (Push to Talk over Cellular) communication service which is specified by the OMA (Open Mobile Alliance).

Similar to the conference communication system described above which is used in a conference room, a conference participant in PTT must operate a special key, typically at his mobile station, so that he can transmit audio messages. During the transmission of audio messages of this conference participant, the transmission of audio messages of other conference participants is blocked, that is to say other conference participants are not enabled to transmit audio messages to conference participants.

In conference communication systems as proposed by the IETF (Internet Engineering Task Force), the issue of the communication right is controlled by means of the BFCP (Binary Floor Control Protocol). In current PTT communication systems, i.e. in communication systems by means of which a push-to-talk communication service is provided, the communication right is requested and issued by using the RTCP (Real Time Control Protocol). Here, too, the issuing of the communication right can be controlled alternatively by means of BFCP.

In conference communication systems, it may be provided that information about the state of participants are sent out. For example, other participants can be informed when a participant is no longer obtainable because the communication terminal used by him for participating in the conference has been switched off or the participant does not wish to receive any communication data sent out by other participants at the moment. Possibilities of sending out information about the state of participants are combined under the term "presence".

Conference communication systems according to the proposal by the IETF and PTT communication systems have a centralized architecture. This means that the users of such communication systems do not communicate directly with one another but by means of a central server computer. If a "mobile" communication system is used for communication, for example a mobile radio communication system, the central server computer is typically arranged in the non-mobile part of the communication system, for example in the core network in the case of a mobile radio communication system according to the UMTS (Universal Mobile Telecommunications System) standard.

In PTT communication systems, the central server computer has a so-called controlling function and typically a number of participating functions communicating with the controlling function. Each participant in a conference provided by means of the central server computer (or, respectively, the communication terminal used by him) is allocated a participating function. The controlling function has a functionality which is allocated to the PTT session, i.e. the conference. A participating function has a functionality which is allocated to the participant who is allocated to the participating function. A participating function which is allocated to a participant can thus be considered to be a part of the communication terminal used by the participant for participating in the conference. However, in the case of a mobile communication system, the participating function is arranged in the non-mobile part of the communication system.

The controlling function and the participating function of the participant in the PTT session can be implemented by different PTT server computers. This is the case, e.g. when the PTT session has been generated by means of a communication network which is not the home network of the participant. In this case, the participating function is implemented by means of a PTT server computer of his own network operator, i.e. of the operator of the home network of the participant. The controlling function of the PTT session, in contrast, is implemented by means of a PTT server computer of the visited network operator, i.e. of the network operator of the communication network by means of which the PTT session was generated. During the PTT session, the participant communicates by means of a communication link between the PTT server computer of his own network operator and the PTT server computer of the visited network operator.

A user of a PTT communication system can also be a participant in a number of PTT sessions at the same time. In this case, there is a communication link between a participating function allocated to the user to the controlling functions of all PTT sessions in which the user is participating.

If a user is a participant in a number of PTT sessions, he determines one of the PTT sessions as primary session. The other PTT sessions are determined as secondary PTT sessions. If communication data (audio data, video data, etc.) are sent out by other participants both in a secondary PTT session and in a primary PTT session in which the user is participating, the participating function allocated to the participant only forwards the communication data sent out during the primary PTT session to the participant. It is only when no communication data are sent out by other participants during the primary PTT session, that communication data which are sent out during a secondary PTT session are forwarded to the participant.

Since the participating functions, at any time, only send communication data to the participant which are sent out in a single PTT session and does not send communication data sent out in two different PTT sessions to the participant at the same time, it may happen that during a PTT session, communication data are sent out which are not received by any participant in the PTT session even though there are participants in the PTT session. During a PTT session, the sender of communication data can thus never be sure that the communication data are received by the participants, for example voice messages are heard by the other participants.

There is therefore a possibility that the sender of communication data in a PTT session arranges to be notified according to the Session Initiation Protocol (SIP) whether audio data sent out by him are forwarded to the other participants in the PTT session by the respective participating functions. The sender of the audio data is notified when he begins to speak or before he begins to speak. If the communication data sent out by a participant are not forwarded to any other participant, the communication right can be withdrawn from the participant.

According to an exemplary embodiment of the invention, an efficient possibility is created for notifying participants in conference systems whether communication data sent out by the participants are forwarded to other participants.

According to an exemplary embodiment of the invention, a conference communication system comprising a conference server unit which provides a conference for a first communication terminal and a second communication terminal, and comprising a forwarding device for forwarding media data during the conference is provided. The first communication terminal transmits media data to the forwarding device for forwarding to the second communication terminal. The conference communication system has a notification device which generates a notification message according to a media data transmission control protocol for controlling a media data transmission protocol, by means of which it is signaled whether the media data have been forwarded to the second communication terminal.

According to other exemplary embodiments of the invention, a method for operating a conference communication system, a notification device and a method for notifying a communication terminal according to the conference communication system described above are provided.

In an exemplary embodiment, the basic concept can be seen in that a notification of a participant in a conference with respect to the forwarding of media data sent out by the participant to other participants in the conference is implemented by means of a media data transmission control protocol, for example by means of the Real Time Control Protocol (RTCP), that is to say by means of real-time control protocol packets (for example of the packet type for application-specific functions (APP) of the real-time control protocol).

The notification message can also be used for signaling whether the media data were received by the second communication terminal. In particular, this implies that the media data were forwarded to the second communication terminal.

According to an exemplary embodiment, in the case of a push-to-talk communication session, an efficient possibility is created for informing a participant in a push-to-talk communication session about whether media data sent out by him during the push-to-talk communication session are forwarded to other participants in the push-to-talk communication session, which is not the case, for example, if one of the other participants has specified the push-to-talk communication session as secondary push-to-talk communication session and during the push-to-talk communication session specified by him as primary push-to-talk communication session, media data are forwarded to him.

Exemplary embodiments of the invention which are described in conjunction with the conference communication system correspondingly also apply to the method for operating a conference communication system, the notification device and the method for notifying a communication terminal.

The conference communication system has, for example, a transmitting device which transmits the notification message to the first communication terminal.

The notification message can also be transmitted to other communication terminals, for example to communication terminals which are used by other participants than the user of the first communication terminal, but also to other devices which are not directly involved in the conference, for example to communication terminals of users who are not participants in the conference.

In one embodiment, the media data transmission protocol is a real-time media data transmission protocol. For example, the media data transmission control protocol is RTCP.

The use of RTCP (Real Time Control Protocol) has the advantage that the notification message can be implemented in a small size. Since, for example in the case of a push-to-talk communication system a RTCP communication link exists in any case, it is not necessary to set up a special RTCP communication link for transmitting the notification message.

In particular, using RTCP provides for a more efficient notification than can be achieved by means of SIP (Session Initiation Protocol).

In one embodiment, the conference server unit has the forwarding device.

The media data are, for example, audio data, video data or image data.

The notification message can be used for signaling whether the media data has been received in sufficient quality by the second communication terminal, whether the media data have been output by the second communication terminal and/or whether the user of the second communication terminal has acknowledged the receipt of the media data.

For example, the first communication terminal sends out receipt acknowledgements which are evaluated by the notification device (for example by the participating function in the case of a PTT communication system). It is only when it is acknowledged that the media data have been received by the first communication terminal that (for example a controlling function) is notified that the media data have been successfully forwarded. This has the advantage that in the case of data transmission errors, for example due to interruption of a communication link, it is not falsely signaled that the media data have been received by the first communication terminal.

The conference is, for example, a push-to-talk (PTT) communication session. The conference communication system can be designed for conference systems according to the IETF (Internet Engineering Task Force) standard.

In the case of a PTT communication session, a participating function allocated to a communication terminal can determine quite simply the conference in which the communication terminal is receiving data by determining what media data are forwarded to the communication terminal. The information required for generating the notification message can thus be determined in a simple and quick manner.

In one embodiment, the conference communication system has a further communication terminal and a further notification device which generates a further notification message according to the media data transmission control protocol by means of which it is signaled whether the media data have been forwarded to the further communication terminal.

In one embodiment, the notification message and the further notification message are transmitted to a processing device and the processing device generates a total notification message on the basis of the notification message and the further notification message and transmits it to the first communication terminal.

By combining notification messages to form a total notification message, to form a RTCP packet in the case of RTCP, transmission capacity can be saved in comparison with the case where the notification messages are transmitted singly to the first communication terminal.

The total notification message can be used, for example, to inform the user of the first communication terminal about the participant (or participants) in the conference to which media data sent out by him (for example voice messages) have been forwarded.

Exemplary embodiments are shown in the figures and will be explained in greater detail in the text which follows.

Figure 1:
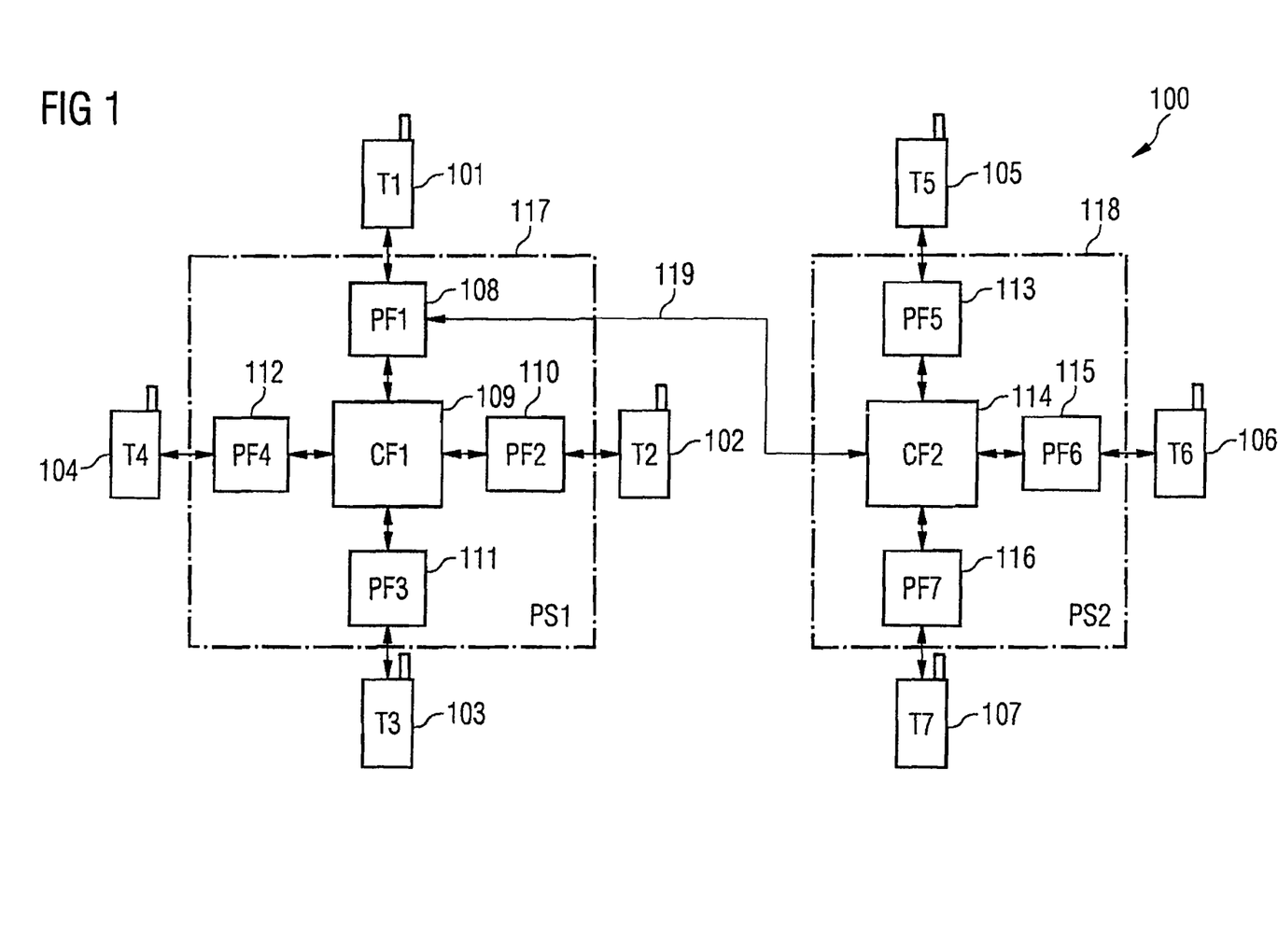
FIG. 1 shows a communication system according to an exemplary embodiment of the invention.

FIG. 1 shows a communication system 100 according to an exemplary embodiment of the invention.

The communication system 100 can be used for providing PTT conferences for a plurality of users. A first user uses a first communication terminal 101, a second user uses a second communication terminal 102, a third user uses a third communication terminal 103, a fourth user uses a fourth communication terminal 104, a fifth user uses a fifth communication terminal 105, a sixth user uses a sixth communication terminal 106 and a seventh user uses a seventh communication terminal 107.

The first communication terminal 101 is coupled to a first controlling function 109 by means of a first participating function 108, the second communication terminal 102 is coupled to the first controlling function 109 by means of a second participating function 110, the third communication terminal 103 is coupled to the first controlling function 109 by means of a third participating function 111, the fourth communication terminal 104 is coupled to the first controlling function 109 by means of a fourth participating function 112, the fifth communication terminal 105 is coupled to a second controlling function 114 by means of a fifth participating function 113, the sixth communication terminal 106 is coupled to the second controlling function 114 by means of a sixth participating function 115, and the seventh communication terminal 107 is coupled to the second controlling function 114 by means of a seventh participating function 116.

The first participating function 108, the second participating function 110, the third participating function 111 and the fourth participating function 112 as well as the first controlling function 109 are implemented by means of a first PTT (push-to-talk) server computer 117. The fifth participating function 113, the sixth participating function 115, the seventh participating function 116 and the second controlling function 114 are implemented by means of a second PTT server computer 118.

The first controlling function 109 provides a first PTT session, that is to say a push-to-talk conference, for the first communication terminal 101, the second communication terminal 102, the third communication terminal 103 and the fourth communication terminal 104 (for the corresponding users, respectively). The second controlling function 114 provides a second PTT session for the fifth communication terminal 105, the sixth communication terminal 106 and the seventh communication terminal 107 (or for the corresponding users, respectively).

During the first PTT session and the second PTT session, the respective participants send and receive communication data (media data). In the present exemplary embodiment, communication takes place by means of audio data during the PTT sessions.

The first participant, i.e. the user of the first communication terminal 101, now also dials into the second PTT session in addition to the first PTT session. For this purpose, the first participating function 108 sets up a communication line 119 to the second controlling function 114. The second controlling function 114 is implemented by the second PTT server computer 118 as mentioned. The first participating function 108, however, is still implemented by the first PTT server computer 117.

It is assumed that the first subscriber has selected the second PTT session as primary session and has selected the first PTT session as secondary session. This means that all audio data (apart from the audio messages sent by the first participant himself), sent out during the second PTT session, are forwarded to the first communication terminal 101. However, audio messages which are sent out during the first PTT session are forwarded to the first communication terminal 101 only when no audio messages are currently sent out during the second PTT session.

It is assumed firstly that no audio message is sent out during the second PTT session and that the second participant, i.e. the user of the second communication terminal 102, wishes to send out an audio message during the first PTT session.

Figure 2:
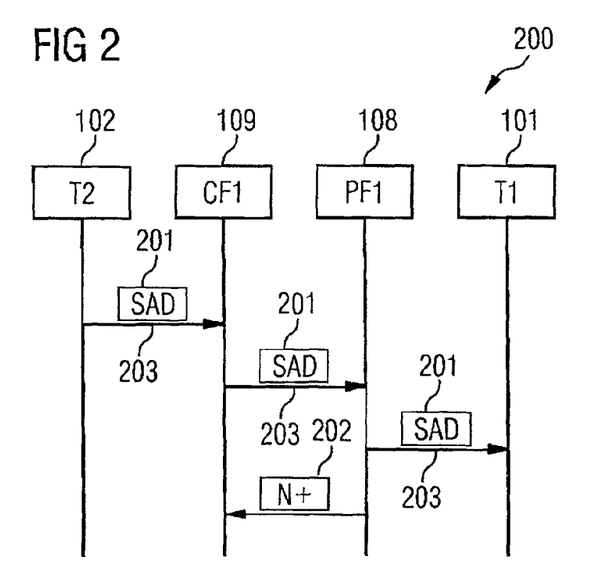
FIG. 2 shows a message flow chart according to an exemplary embodiment of the invention.

The corresponding message flow is shown in FIG. 2.

FIG. 2 shows a message flow chart 200 according to an exemplary embodiment of the invention.

The message flow shown takes place between the second communication terminal 102, the first controlling function 109, the first participating function 108 and the first communication terminal 101.

The second participant presses a PTT key provided on the second communication terminal 102 and begins to speak. The second communication terminal 102 generates corresponding voice data 201 which are sent out by the second communication terminal 102 by means of the second participating function 110 to the first controlling function 109 which forwards the voice data 201 to the first participating function 108. The first participating function 108 forwards the voice data 201 to the first communication terminal 101 and sends a notification message 202 to the first controlling function 109 by means of which the first controlling function 109 is notified that the voice data 201 have been forwarded to the first communication terminal 101.

The arrows 203 symbolize each beginning of the transmission of the voice data 201 (SAD: Start of Audio Data). In the present exemplary embodiment, the notification message 202 is sent out by the first participating function 108 as soon as the first participating function 108 has begun to send the voice data 201 to the first communication terminal 101. The notification message 202 is arranged in accordance with the RTCP (Real Time Control Protocol) for example as shown in Table 1.

PT=APP=204: Indicator that this is an application-defined RTCP message

Length: Specifies the volume of the message from the length field in words (32 bits).

SSRC: Specifies the synchronization source of the participating function which sends out the message. The SSRC identifies a sender of a media stream unambiguously and is defined in the RTP packets belonging to the RTCP message.

Name=PoC1: Application-defined message name (POC1=PTT over Cellular Version 1) SDES CNAME item followed by SDES NAME item: CNAME and NAME of the communication terminal to which the communication data are forwarded, which is notified by means of the message (of the first communication terminal 101 in the present example). CNAME and NAME are SDES (Source Description RTCP Packets) items which are defined in SDES RTCP packets in order to describe an RTP participant. CNAME is an unambiguous name of the RTP participant which also continues to exist outside of specific RTP sessions; for example, it is composed of a user name and a host IP (Internet Protocol) address. NAME is any name of the RTT participant which is typically defined by the RTP participant himself. NAME does not need to identify the RTP participant unambiguously. As in the case of SDES RTCP packets, the list of the SDES items CNAME and NAME is unambiguously concluded by a SDES item of type 00000000. The list is then filled up by padding with zeros up to multiples of 32 bits.

The third participating function 111 and the fourth participating function 112 also send corresponding notifications to the first controlling function 109 analogously to the notification message 202. The first controlling function collects all notifications. This means that the first controlling function 109 waits until it has received notifications for all participants apart from the user of the second communication terminal

TABLE 1

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|0 1 0 1 0|     PT=APP=204    |            length          |
+-+-+-+-+-+-+-+-+-+-+-+-+-+-+-+-+-+-+-+-+-+-+-+-+-+-+-+-+-+-+-+-+
|                            SSRC                                |
+-+-+-+-+-+-+-+-+-+-+-+-+-+-+-+-+-+-+-+-+-+-+-+-+-+-+-+-+-+-+-+-+
|                          name=PoC1                             |
+-+-+-+-+-+-+-+-+-+-+-+-+-+-+-+-+-+-+-+-+-+-+-+-+-+-+-+-+-+-+-+-+
|              SDES CNAME item followed by SDES NAME item        |
:                                                                :
|                                                                |
+-+-+-+-+-+-+-+-+-+-+-+-+-+-+-+-+-+-+-+-+-+-+-+-+-+-+-+-+-+-+-+-+
```

In Table 1 (and in the subsequent tables, if there is a corresponding entry), the following applies:

V=2: Version number of the RTP (Real Time Protocol)

P: Indicator for padding

01010: Subtype of the message; the exemplary value 01010 in this example means that the message is a notification about the reception of audio data (other values can also be used).

102 from the participating functions allocated to the participants. This is shown in FIG. 3.

Figure 3:
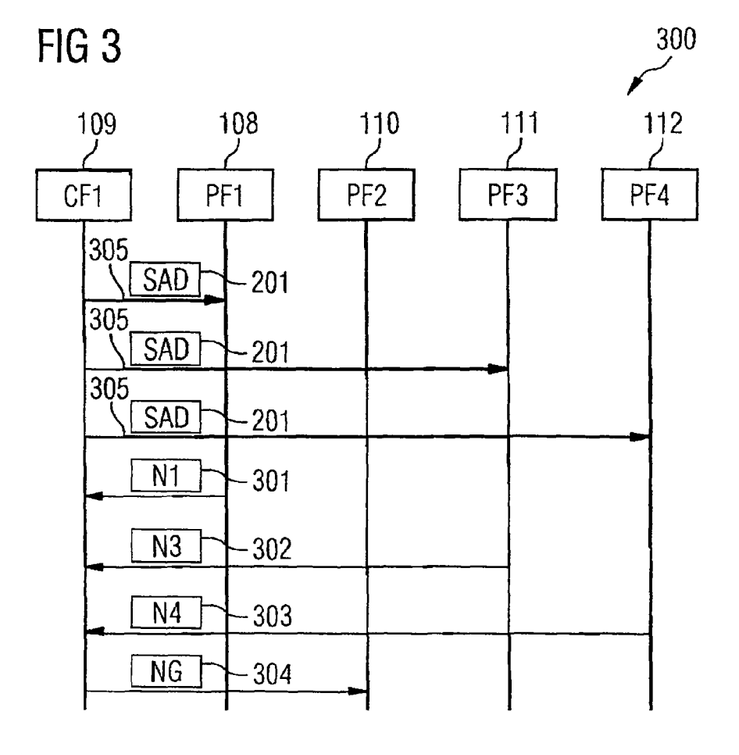
FIG. 3 shows a message flow chart according to an exemplary embodiment of the invention.

FIG. 3 shows a message flow diagram 300 according to an exemplary embodiment of the invention.

The message flow shown takes place between the first controlling function 109, the first participating function 108, the second participating function 110, the third participating function 111 and the fourth participating function 112.

The voice data 201 sent out by the second communication terminal 102 are sent by the first controlling function 109 to the first participating function 108, the third participating function 111 and the fourth participating function 112 (the arrows 305 symbolize each beginning of the transmission of voice data 201). The first participating function 108 confirms by means of a first notification message 301 that it is forwarding the voice data 201 to the first communication terminal 101 as soon as it begins with the forwarding. Analogously, the third participating function 111 sends a second notification message 302 and the fourth participating function 112 sends a third notification message 303. After the first controlling function 109 has received the notifications in the form of the notification messages 301, 302, 303, it combines the notifications to form a total notification message 304 and sends it to the second participating function 110.

The first notification message 301, the second notification message 302 and the third notification message 303 are combined to form the total notification message 304 in such a manner that the corresponding notifications about the forwarding of the audio data sent out by the second communication terminal are combined in a first list. In the case where one of the participating functions 108, 111, 112 does not forward the communication data to the corresponding communication terminal 101, 103, 104 (as occurs in an example described below), it notifies the first controlling function 109, by means of the notification message 301, 302, 303 sent by it, that it is not forwarding the communication data. Notifications that the communication data have not been forwarded are combined in a second list by the first controlling function 109. The first list and the second list are contained in the fourth notification message 304. The fourth notification message 304 is arranged according to RTCP, for example as shown in Table 2.

In Table 2, the following applies:

01010: Subtype of the message; the exemplary value 01010 in this example means that the message is a notification about the reception of audio data (other values can also be used).

list 1 of SDES CNAME item followed by SDES NAME item: list of pairs of the CNAMEs and NAMEs of the communication terminals to which the communication data are forwarded (that is to say, specification of the first list). The list is unambiguously concluded by an SDES item of type 00000000.

list 2 of SDES CNAME item followed by SDES NAME item: list of pairs of the CNAMEs and NAMEs of the communication terminals to which the communication data are not forwarded (that is to say, specification of the second list). The list is unambiguously concluded by an SDES item of type 00000000. The list is then filled up by padding with zeros up to multiples of 32 bits.

Figure 4:
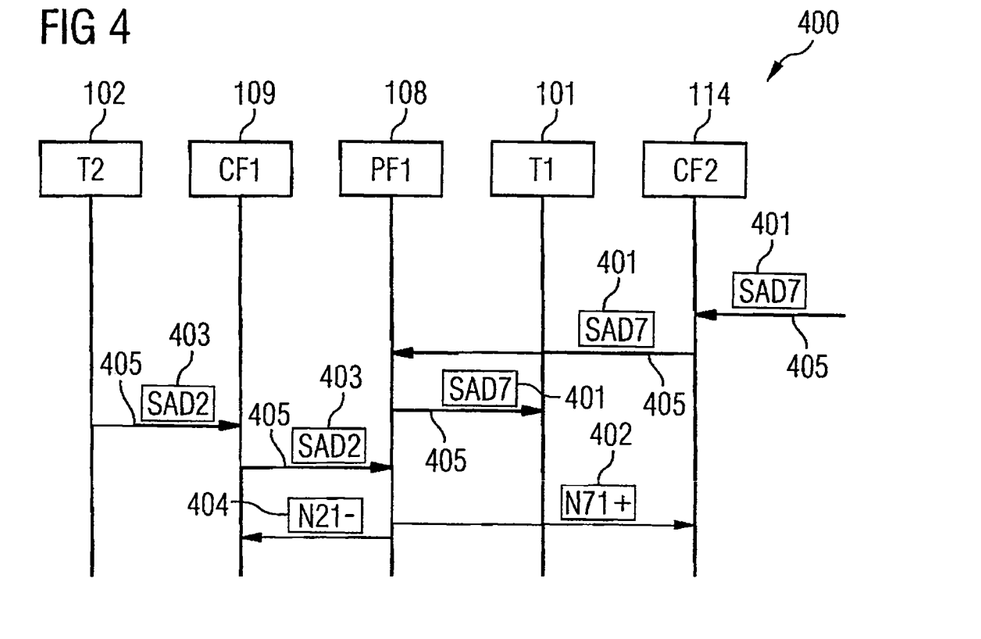
FIG. 4 shows a message flow chart according to an exemplary embodiment of the invention.

It is now assumed that during the second PTT session, the seventh participant, i.e. the user of the seventh communication terminal 107, sends out voice data which are forwarded to the first communication terminal 101 since the first participant has defined the second PTT session as primary session.

This will be explained with reference to FIG. 4 in the text which follows.

FIG. 4 shows a message flow diagram 400 according to an exemplary embodiment of the invention.

The message flow shown takes place between the second communication terminal 102, the first controlling function 109, the first participating function 108, the first communication terminal 101 and the second controlling function 114.

The second controlling function 114 receives voice data 401 from the seventh communication terminal 107 and for-

TABLE 2

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|0 1 0 1 0|    PT=APP=204 |            length             |
+-+-+-+-+-+-+-+-+-+-+-+-+-+-+-+-+-+-+-+-+-+-+-+-+-+-+-+-+-+-+-+-+
|                             SSRC                              |
+-+-+-+-+-+-+-+-+-+-+-+-+-+-+-+-+-+-+-+-+-+-+-+-+-+-+-+-+-+-+-+-+
|                           name=PoCl                           |
+-+-+-+-+-+-+-+-+-+-+-+-+-+-+-+-+-+-+-+-+-+-+-+-+-+-+-+-+-+-+-+-+
|                                                               |
:         list 1 of SDES CNAME item followed by SDES NAME item  :
|                                                               |
+-+-+-+-+-+-+-+-+-+-+-+-+-+-+-+-+-+-+-+-+-+-+-+-+-+-+-+-+-+-+-+-+
|                                                               |
:         list 2 of SDES CNAME item followed by SDES NAME item  :
|                                                               |
+-+-+-+-+-+-+-+-+-+-+-+-+-+-+-+-+-+-+-+-+-+-+-+-+-+-+-+-+-+-+-+-+
``` wards it to the first participating function 108. The first participating function 108 forwards the voice data 401 to the first communication terminal 101 and indicates this to the second controlling function 114 by means of a first notification message 402.

If the second communication terminal 102 then sends out further voice data 403 during the first PTT session, these are forwarded by the first controlling function 109 to the first participating function 108, but the first participating function 108 does not forward the further voice data 403 to the first communication terminal 101 since voice data sent out during the second PTT session (and thus the primary PTT session of the first communication terminal 101) are already being forwarded to the first communication terminal 101.

The first participating function 108 correspondingly notifies the first controlling function 109 by means of a second notification message 404 that the further voice data 403 are not being forwarded to the first communication terminal 101.

The second notification message 404 is arranged, for example, like the total notification message 304 according to Table 2, only the first participant being entered in list 2 of SDES CNAME item followed by SDES NAME item.

The first notification message 402 is arranged, for example, as above according to Table 1.

The arrows 405 symbolize the beginning of each transmission of voice data.

It is then assumed that the sending out of communication data in the second PTT session is ended. The corresponding message flow will be explained with reference to FIG. 5 in the text which follows.

Figure 5:
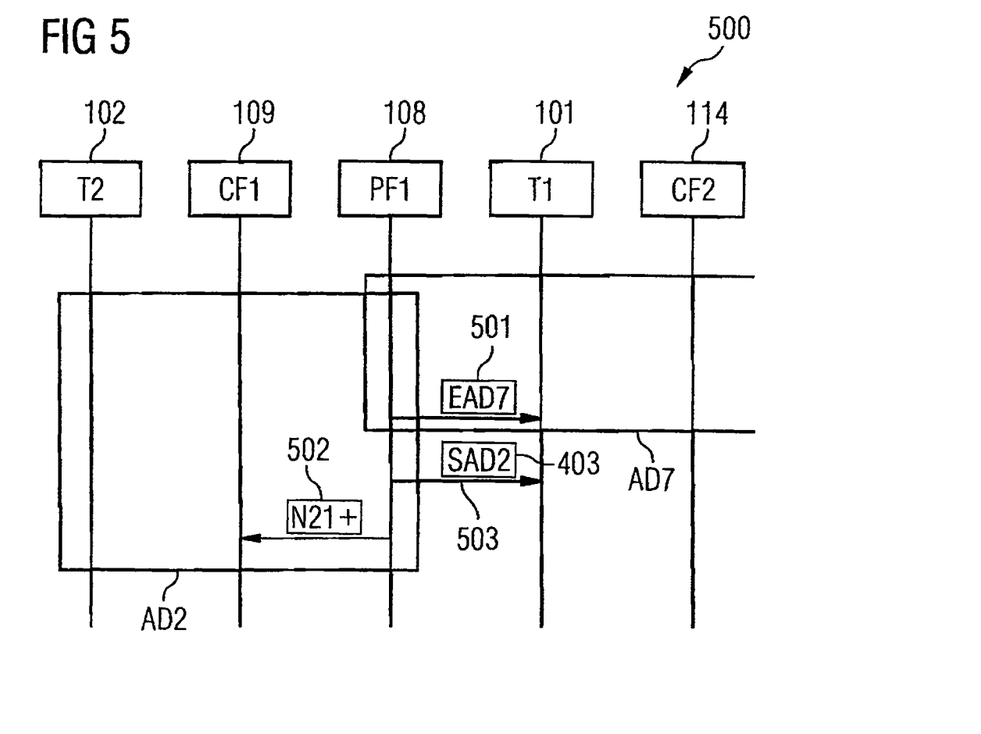
FIG. 5 shows a message flow chart according to an exemplary embodiment of the invention.

FIG. 5 shows a message flow diagram 500 according to an exemplary embodiment of the invention.

The message flow shown takes place between the second communication terminal 102, the first controlling function 109, the first participating function 108, the first communication terminal 01 and the second controlling function 114.

The seventh communication terminal 107 stops sending the voice data 401 in the second PTT session. Thus, the forwarding of voice data from the first participating function 108 to the first communication terminal 101 is ended which is indicated by block 501 in FIG. 5 (EAD: End of Audio Data). It is assumed that no further communication data are sent out in the second PTT session.

Correspondingly, the first participating function 108 now forwards the further voice data 403 sent out by the second communication terminal 102 to the first communication terminal 101 (the arrow 503 symbolizes the beginning of this data transmission). Furthermore, the first participating function 108 informs the first controlling function 109 by means of a notification message 502 that the further voice data 403 are forwarded to the first communication terminal 101.

It is now assumed that communication data are again sent out by the seventh communication terminal 107 during the second PTT session. The corresponding message flow is shown in FIG. 6.

Figure 6:
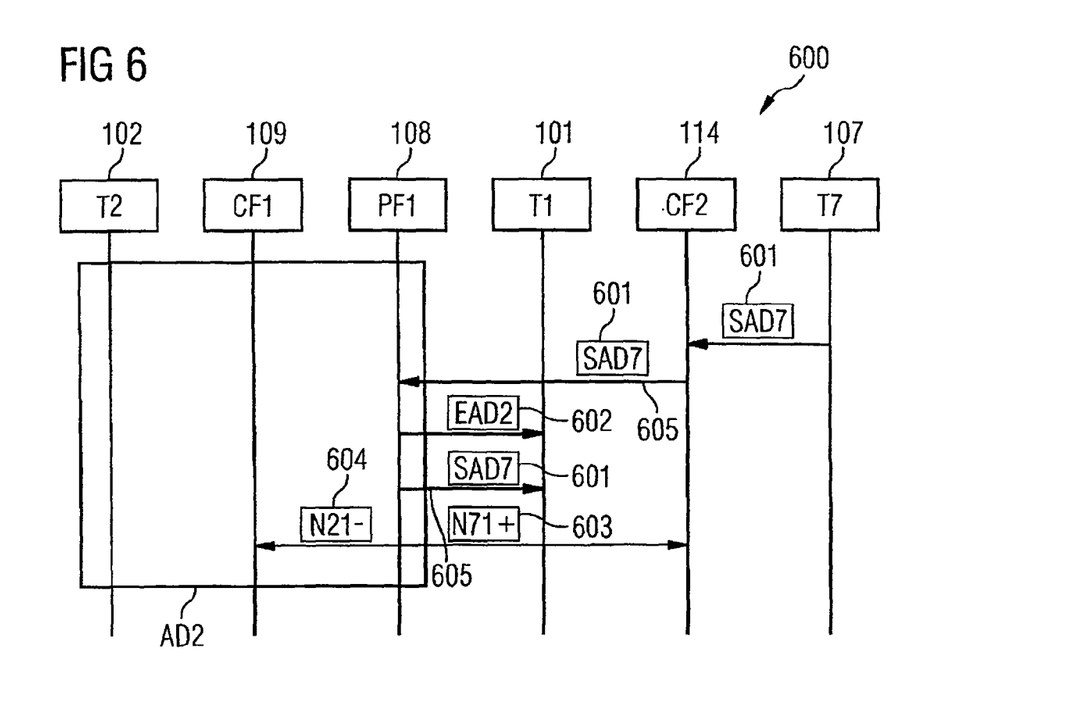
FIG. 6 shows a message flow chart according to an exemplary embodiment of the invention.

FIG. 6 shows a message flow diagram 600 according to an exemplary embodiment of the invention.

The message flow shown takes place between the second communication terminal 102, the first controlling function 109, the first participating function 108, the first communication terminal 101, the second controlling function 114 and the seventh communication terminal 107. The seventh communication terminal 107 sends out voice data 601 during the second PTT session. The voice data 601 are forwarded by the second controlling function 114 to the first participating function 108. The first participating function 108 thereupon stops forwarding the further voice data 403, sent out by the second communication terminal 102, to the first communication terminal 101 which is indicated by block 602 in FIG. 6.

The first participating function 108 then begins forwarding the voice data 601 to the first communication terminal 101 and notifies the second controlling function 114 by means of a first notification message 603 that the voice data 601 are being forwarded to the first communication terminal 101. Furthermore, the first participating function 108 notifies the first controlling function 109 by means of a second notification message 604 that the further voice data 403 sent out by the second communication terminal 102 are no longer being forwarded to the first communication terminal 101.

Figure 7:
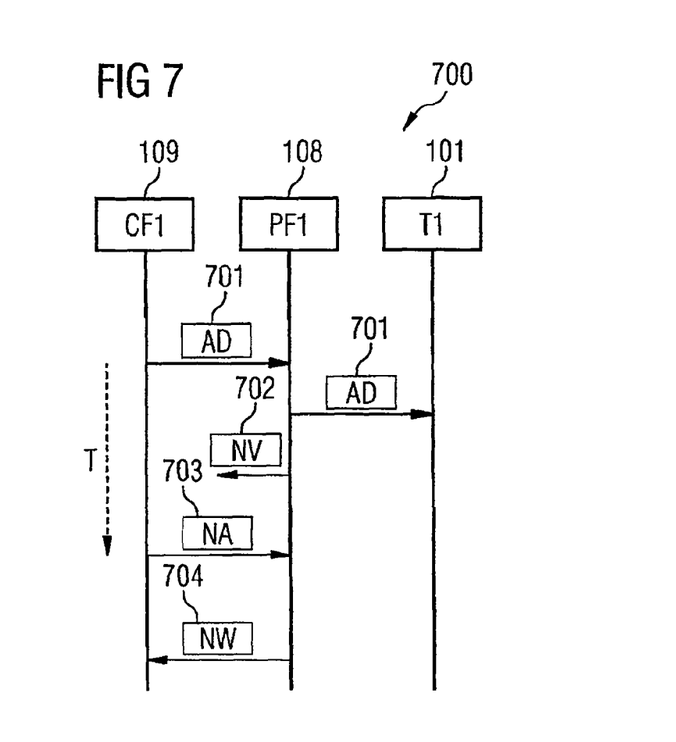
FIG. 7 shows a message flow chart according to an exemplary embodiment of the invention.

Analogously to the above, the arrows 605 symbolize the beginning of each data transmission. FIG. 7 illustrates the procedure in the case where a controlling function is not notified by a participating function.

FIG. 7 shows a message flow diagram 700 according to an exemplary embodiment of the invention.

The message flow shown takes place between the first controlling function 109, the first participating function 108 and the first communication terminal 101.

The first controlling function 109 sends out audio data 701 to the first participating function 108 which forwards the audio data 701 to the first communication terminal 101. Correspondingly, the first participating function 108 sends out a first notification message 702 to the first controlling function 109. It is assumed, however, that the notification message 702 is not received by the first controlling function 109, for example because the first notification message 702 is lost due to a transmission error. It may also be that the first notification message 702 is not even sent out by the first participating function 108 since the audio data 701 has not been received by the first participating function 108, for example due to a data transmission error. In any case, the first controlling function 109 thus does not receive a notification from the first participating function 108 which indicates whether the audio data 701 are being forwarded to the first communication terminal 101. After a certain waiting time T, the first controlling function 109, therefore, requests a notification from the participating function 108 by means of a notification request message 703. In response, the participating function 108 sends out a second notification message 704 as repetition of the first notification message 702.

In the present exemplary embodiment, the notification request message 703 is arranged according to RTCP and is sent out according to RTCP and is arranged, for example, according to Table 3.

TABLE 3

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|0 1 0 1 1|    PT=APP=204     |            length=2        |
+-+-+-+-+-+-+-+-+-+-+-+-+-+-+-+-+-+-+-+-+-+-+-+-+-+-+-+-+-+-+-+-+
|                              SSRC                              |
+-+-+-+-+-+-+-+-+-+-+-+-+-+-+-+-+-+-+-+-+-+-+-+-+-+-+-+-+-+-+-+-+
|                            name=PoCl                           |
+-+-+-+-+-+-+-+-+-+-+-+-+-+-+-+-+-+-+-+-+-+-+-+-+-+-+-+-+-+-+-+-+
```

The character string 01011 in Table 3 indicates that the message arranged according to Table 3 is a notification request message. This value is only an exemplary value, other values can also be used. SSRC is the synchronization source of the media stream of the controlling function which sends out the notification request and identifies the controlling function and the media stream unambiguously.

In one embodiment, it is provided that notifications about the forwarding of media data are sent out to a participant when the participant himself is not yet sending out any media data. The notifications thus specify whether media data sent out by the participant would be forwarded to other participants (in the same PTT session) if the participant were to send out media data.

In one embodiment, it is provided that the communication right, i.e. the right to send out communication data (media data) during a PTT session, is not issued to a participant if communication data sent out by him would not be forwarded to any other participant in the PTT session. If communication data which are sent out by a participant are no longer forwarded to other participants (for example since the other participants are now receiving communication data as part of their respective primary other PTT session), the communication right can be withdrawn from the participant by the corresponding PTT server computer (this is called revoke).

It may also be provided that notifications are sent out only if communication data are forwarded to a participant and thus notifications that communication data are not being forwarded to a participant are not sent out. In contrast to the above exemplary embodiment, however, the corresponding controlling function is not allowed to wait for notifications from all participants before a total notification is created and transmitted to the participant who is sending out the communication data. Instead, the controlling function sends out, for example always after a fixed period of time after the sending out of the communication data, a total notification to the participant who is sending out the communication data. As an alternative, the controlling function can transmit a notification to the participant sending out the communication data whenever it receives a notification from a participant.

In one embodiment, in which both notifications that communication data are being forwarded to participants and notifications that communication data are not being forwarded to participants are sent out, it may also be provided that the controlling function sends out a total notification when the controlling function receives a notification from a participating function. Thus, total notifications are transmitted to the participant sending out communication data not only when the controlling function is receiving notifications that the communication data are being forwarded, but also when it receives notifications that communication data are not being forwarded.

It may also be provided that a participating function sends out a notification only when it is not forwarding communication data to the corresponding participant and not when it is forwarding communication data.

It may also be provided that a combined (total) notification is only sent out whenever the condition to which participants communication data sent out are forwarded during the PTT session has changed. It may be, for example, that the forwarding of communication data to a participant which are sent out as part of the PTT session defined by him as secondary PTT session is ended at a point in time since the sending out of communication data which are forwarded to him begins as part of the primary PTT session of the participant at this point in time. The sender of the communication data which are sent out as part of a secondary session of the participant can be informed about this change in reception status (or forwarding status) of the participant.

When the sender of communication data changes during the secondary session, the communication data sent out are also not being forwarded to the participant. In this case, for example, only a notification is sent out that the communication data are not being forwarded to the participant, and notifications are not sent out every time when the sender changes within the secondary PTT session.

In the exemplary embodiments described above, a participating function sends out notifications whether communication data sent out during a PTT session are being forwarded by the participating function to a communication terminal. Analogously, notifications can also be sent out about 1) whether the communication data forwarded have actually been received in adequate quality by the communication terminal. The quality of transmission of the communication data can be concluded from the RTCP receiver reports of the communication terminal which are sent to the participating function, but can also be signaled by means of special RTCP packets. A corresponding notification is then transmitted to the corresponding controlling function by the participating function.

2) whether the communication data forwarded were actually output by the communication terminal for the user of the communication terminal (for example, played back in the case of voice data). For this purpose the communication terminal reports the reception of the communication data of the participating function by means of a corresponding message. The message is arranged, for example, according to Table 1.

3) whether the participant, i.e. the user of the communication terminal, has acknowledged the reception of the communication data. For this purpose, the communication terminal reports the reception of the communication data to the participating function only when the participant has acknowledged the reception, for example by operating a special key on the communication terminal. The communication terminal reports this to the participating function by means of a message which is arranged, for example, according to Table 1.

It may also be provided that the type of reception of the communication data (i.e. forwarded by the participating function, received in adequate quality, communication data output or reception of the communication data acknowledged by the participants) is specified in the notifications. This is indicated, for example, in a notification according to RTCP by means of a "received type" element.

Instead of sending out notifications automatically for particular events (for example, as described above, whenever a participant begins to send out communication data or when the reception status of a participant changes, i.e. when the communication data have initially not been forwarded to a participant and now are forwarded, or conversely), it may also be provided to send out notifications only or additionally on request. A request following a notification can be arranged, for example, according to Table 3. A notification can be requested from a participating function by a controlling function or from the controlling function by a participating function or from the communication terminal allocated to the participating function or can be requested by a communication terminal from the participating function allocated to the communication terminal.

It may also be provided that notifications are periodically repeated. Periodic notifications can be issued additionally to event-triggered or requested notifications. The periodic notifications are issued only during the transmission of communication data. Periodic notifications can be requested, for example, by means of a message which is arranged according to Table 4.

The bit combination 01100 indicates the subtype of the message, namely that this is a periodic notification request (as above, other values can also be used). The value "period" specifies the period in which the requested periodic notifications are to be sent out (in ms). The value is specified as a positive 32-bit integer value. The value 0 means single notification.

The message format shown in Table 4 corresponds to the message format shown in Table 3 with the additional periodicity information (by means of the value "period"). Periodic notifications can be requested by the controlling function from a participating function or by a participating function from the controlling function or the communication terminal belonging to the participating function or by the communication terminal from the participating function belonging to the communication terminal.

In the notification messages according to RTCP, the communication terminals to which the communication data may be forwarded can also be identified by other identifiers than CNAME and NAME. For example, other SDES items of the RTP specification can also be used for identifying the communication terminals.

What is claimed:

1. A conference communication system, comprising:
   a conference server unit configured to provide a conference for a first, communication terminal and a second communication terminal;
   a forwarding device configured to forward media data in the conference, wherein the first communication terminal is configured to transmit media data to the forwarding device for forwarding to the second communication terminal; and
   a notification device configured to generate a notification message according to a media data transmission control protocol for controlling a media data transmission protocol, which is used for signaling whether the media data have been forwarded to the second communication terminal.

2. The conference communication system as claimed in claim 1, further comprising a transmitting device configured to transmit the notification message to the first communication terminal.

TABLE 4

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|0 1 1 0 0|    PT=APP=204 |           length=3            |
+-+-+-+-+-+-+-+-+-+-+-+-+-+-+-+-+-+-+-+-+-+-+-+-+-+-+-+-+-+-+-+-+
|                             SSRC                              |
+-+-+-+-+-+-+-+-+-+-+-+-+-+-+-+-+-+-+-+-+-+-+-+-+-+-+-+-+-+-+-+-+
|                           name=PoC1                           |
+-+-+-+-+-+-+-+-+-+-+-+-+-+-+-+-+-+-+-+-+-+-+-+-+-+-+-+-+-+-+-+-+
|                                                               |
:                            period                             :
|                                                               |
+-+-+-+-+-+-+-+-+-+-+-+-+-+-+-+-+-+-+-+-+-+-+-+-+-+-+-+-+-+-+-+-+
```

3. The conference communication system as claimed in claim 1, wherein the media data transmission protocol is a real-time media data transmission protocol.

4. The conference communication system as claimed in claim 1, wherein the media data transmission control protocol is RTCP.

5. The conference communication system as claimed in claim 1, wherein the conference server unit comprises the forwarding device.

6. The conference communication system as claimed in claim 1, wherein the media data is audio data, video data or image data.

7. The conference communication system as claimed in claim 1, wherein the notification message is used for signaling whether the media data have been received with adequate quality by the second communication terminal, whether the media data were output by the second communication terminal or whether the user of the second communication terminal has acknowledged the reception of the media data.

8. The conference communication system as claimed in claim 1, wherein the notification message is used for signaling whether the media data have been received with adequate quality by the second communication terminal, whether the media data were output by the second communication terminal and whether the user of the second communication terminal has acknowledged the reception of the media data.

9. The conference communication system as claimed in claim 1, wherein the conference is a push-to-talk communication session.

10. The conference communication system as claimed in claim 1, further comprising a further communication terminal and a further notification device configured to generate a further notification message according to the media data transmission control protocol which is used for signaling whether the media data have been forwarded to the further communication terminal.

11. The conference communication system as claimed in claim 10, wherein the notification message and the further notification message are transmitted to a processing device and the processing device is configured to generate, based on the notification message and the further notification message, and transmit to the first communication terminal a total notification message.

12. The conference communication system as claimed in claim 1, wherein the notification device is configured to generate the notification message periodically.

13. A method for operating a conference communication system comprising a conference server unit which provides a conference for a first communication terminal and a second communication terminal, and a forwarding device which forwards media data in the conference, the method comprising:
  transmitting media data to the forwarding device for forwarding to the second communication terminal by the first communication terminal;
  generating a notification message according to a media data transmission control protocol for controlling a media data transmission protocol which is used for signaling whether the media data have been forwarded to the second communication terminal; and
  transmitting the notification message to the first communication terminal.

14. The method as claimed in claim 13, wherein the notification message is transmitted to the first communication terminal.

15. The method as claimed in claim 13, wherein the media data transmission protocol is a real-time media data transmission protocol.

16. The method as claimed in claim 15, wherein the media data transmission control protocol is RTCP.

17. The method as claimed in claim 13, wherein the media data is audio data, video data or image data.

18. The method as claimed in claim 13, wherein the notification message is used for signaling whether the media data have been received with adequate quality by the second communication terminal, whether the media data were output by the second communication terminal or whether the user of the second communication terminal has acknowledged the reception of the media data.

19. The method as claimed in claim 13, wherein the notification message is used for signaling whether the media data have been received with adequate quality by the second communication terminal, whether the media data were output by the second communication terminal and whether the user of the second communication terminal has acknowledged the reception of the media data.

20. The method as claimed in claim 13, wherein the conference is a push-to-talk communication session.

21. The method as claimed in claim 13, wherein the notification message is generated periodically.

22. A notification device of a conference communication system comprising:
  a conference server unit configured to provide a conference for a first communication terminal and a second communication terminal; and
  a forwarding device configured to forward media data in the conference,
  wherein the notification device is configured to generate a notification message according to a media data transmission control protocol for controlling a media data transmission protocol which is used for signaling whether media data which were transmitted from the first communication terminal to the forwarding device for forwarding to the second communication terminal have been forwarded to the second communication terminal.

23. A method for notifying a communication terminal of a conference communication system comprising a conference server unit providing a conference for the communication terminal and a further communication terminal, and a forwarding device forwarding media data in the conference, the method comprising:
  generating, by means of a notification device, a notification message according to a media data transmission control protocol for controlling a media data transmission protocol which is used for signaling whether media data which were transmitted from the communication terminal to the forwarding device for forwarding to the further communication terminal have been forwarded to the further communication terminal.

24. The method as claimed in claim 23, wherein the notification message is transmitted to the first communication terminal.

25. The method as claimed in claim 23, wherein the media data transmission protocol is a real-time media data transmission protocol.

26. The method as claimed in claim 23, wherein the media data transmission control protocol is RTCP.

27. The method as claimed in claim 23, wherein the media data is audio data, video data or image data.

28. The method as claimed in claim 23, wherein the notification message is used for signaling whether the media data have been received with adequate quality by the second communication terminal, whether the media data were output by the second communication terminal or whether the user of the second communication terminal has acknowledged the reception of the media data.

29. The method as claimed in claim 23, wherein the notification message is used for signaling whether the media data have been received with adequate quality by the second communication terminal, whether the media data were output by the second communication terminal and whether the user of the second communication terminal has acknowledged the reception of the media data.

30. The method as claimed in claim 23, wherein the conference is a push-to-talk communication session.

31. The method as claimed in claim 23, wherein the notification message is generated periodically.

32. A conference communication system, comprising:
- a conference server means for providing a conference for a first communication terminal and a second communication terminal;
- a forwarding means for forwarding media data in the conference, wherein the first communication terminal transmits media data to the forwarding means for forwarding to the second communication terminal; and
- a notification means for generating a notification message according to a media data transmission control protocol for controlling a media data transmission protocol, which is used for signaling whether the media data have been forwarded to the second communication terminal.

* * * * *